United States Patent
Altounian et al.

(10) Patent No.: US 7,434,076 B1
(45) Date of Patent: Oct. 7, 2008

(54) DEVICE AND METHOD FOR WIRELESS COMMUNICATION SELECTION AND CONTROL

(75) Inventors: David Altounian, Austin, TX (US); Theodore S. Rappaport, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 441 days.

(21) Appl. No.: 11/187,377

(22) Filed: Jul. 22, 2005

(51) Int. Cl.
*G06F 1/32* (2006.01)

(52) U.S. Cl. .................. 713/324; 713/320; 713/323

(58) Field of Classification Search ............ 455/553.1, 455/556.1, 556.2, 557, 574, 132, 133, 140, 455/343.2, 343.5; 340/539.3, 10.34, 5.61; 713/300, 320, 323, 324
See application file for complete search history.

(56) References Cited

U.S. PATENT DOCUMENTS

| | | | |
|---|---|---|---|
| 5,408,520 A * | 4/1995 | Clark et al. ............ 379/93.07 |
| 6,018,232 A | 1/2000 | Nelson et al. | |
| 6,304,899 B1 | 10/2001 | Cromer et al. | |
| 6,628,965 B1 | 9/2003 | LaRosa et al. | |
| 6,748,246 B1 * | 6/2004 | Khullar ..................... 455/574 |
| 6,801,777 B2 | 10/2004 | Rusch | |
| 7,266,389 B2 * | 9/2007 | Karaoguz et al. ........ 455/556.1 |
| 2002/0132649 A1 * | 9/2002 | Motohashi .................. 455/572 |
| 2003/0100308 A1 * | 5/2003 | Rusch ......................... 455/445 |
| 2004/0082362 A1 * | 4/2004 | Peng et al. ................ 455/556.2 |
| 2004/0142725 A1 * | 7/2004 | Kim .......................... 455/556.1 |
| 2006/0068854 A1 * | 3/2006 | Sandhu ....................... 455/574 |

* cited by examiner

*Primary Examiner*—Dennis M Butler
(74) *Attorney, Agent, or Firm*—Kevin L. Daffer; Daffer McDaniel, LLP

(57) ABSTRACT

A wireless communication device and system is provided for detecting an incoming wireless signal and selecting the power state and performance of one or more interface units that are adapted to receive the wireless signal. Depending on which interface unit recognizes the incoming signal, that unit may be supplied full power and maximum performance, whereas all other interface units are powered down or placed in a lower performance state. User preferences can be input into the device and used to manually select certain interfaces. The user preferences can be overridden by the automatic detection mechanism or vice-versa. The detection and user preferences are affected by the network characteristics, and the location, traffic, and interrogation/acknowledge signals sent across the network in order to optimize the automatic selection and user preference capability.

14 Claims, 4 Drawing Sheets

DEVICE AND METHOD FOR WIRELESS COMMUNICATION SELECTION AND CONTROL

BACKGROUND OF THE INVENTION

1. Field of the Invention

The present invention relates in general to wireless communications and, more particularly, to a portable communication device employing one or more interfaces that can selectively receive power or different power-on states depending on which interface receives a communication signal over a wireless medium, or which interface is user-selected or programmed to receive the signal while other interfaces can be selectively powered down to conserve battery life.

2. Description of the Related Art

The following descriptions and examples are not admitted to be prior art by virtue of their inclusion within this section.

In recent years, there has been a significant market increase in portable electronic devices, such as laptop computers, notebooks, palm-size computers, and personal digital assistants (PDAs). Unlike desktop computers and the like, portable or mobile computing devices generally operate off batteries that must be periodically recharged. Presently available batteries have limited storage capabilities, and it is important that portable computing devices limit their power draw when various subsystems are not being used. There is known a wide range of techniques for conserving power in portable, battery-powered computing devices. Typically, power conservation includes shutting down subsystems (or portions) of the computing device by placing the device in various states of operation such as, for example, suspend, sleep, and standby states.

As portable devices have become more popular, the central processing and memory management functions can be achieved through lower power integrated circuits. Moreover, a greater emphasis has been placed on the communication capability of the portable device since many devices rely less on processing speed and more on being able to communicate over a wireless medium. Therefore, the proliferation of cellular and wireless technology had led to a dramatic increase in what is known as "wireless" computing devices. Wireless devices are generally used to communicate with one another without cable or wires therebetween. Wireless communication has led to an increase in the mobility of the portable device since it allows transmission and communications from virtually any location where a wireless or cellular system is present.

With the increased emphasis on communication features, the continuum of different power consumption states (i.e., suspend, sleep and standby), used in conventional portable devices proves ineffective when such devices employ wireless communication. A significant purpose behind a wireless portable device is to be able to receive messages from an external source at all times. If the portable device is in a sleep, suspend, or standby state, it is possible that the receiver within the interface of the portable device is powered down and therefore incapable of receiving the incoming signal. In order to alleviate this problem, typical portable devices generally maintain power to the communication interface circuits at all times in order to receive and recognize incoming messages regardless of when such messages are sent.

The interface circuit generally includes an amplifier, a clock recovery circuit, and possibly an oscillator associated with that recovery circuit, all of which consume considerable amounts of power. The problem is compounded whenever the portable device has multiple interface circuits or radios onboard. For example, many portable devices might have a Bluetooth® interface, a GSM/GPRS interface, a wireless local area network interface, a code division multiple access (CDMA) interface, as well as possibly other RF interfaces associated with a single portable device. If all such interfaces remain powered on, the battery life is substantially lessened, thus making the portable device impractical for many applications.

SUMMARY OF THE INVENTION

The problems outlined above are in large part solved by an improved portable communication device hereof. The communication device is powered by a battery and may contain multiple interface circuits or radios coupled to respective antennas. Each interface circuit can be powered down to a low power state, except for possibly the initial receiving block of a transceiver. Upon receiving a communication signal, a detector associated with the communication device can wake up the appropriate interface circuit that corresponds to the incoming signal format or protocol. Thus, for example, if the incoming format is CDMA, the CDMA interface is brought from a low power state in which only the receiver is powered, to a fully powered state in which other subsystems of that interface now receive power in order to recognize the incoming signal, and forward that signal into the latch/buffer and to recover the appropriate clock therefrom.

Alternatively or in addition to the mechanism for intelligently powering up the appropriate interface circuit, user preferences can also be taken into account. For example, through a graphical user interface (GUI), a user can designate various modes of operation. The user might, for example, select through a Windows® control panel that the interface circuits be placed in a maximum performance mode, a maximum battery mode, a presentation mode, or other modes of operation. In a maximum performance mode, each interface, regardless of whether it is being used, can be fully powered to allow the transceivers to receive and send signals at the optimal speeds. In a maximum battery mode, only the interface that is currently receiving or sending a signal is powered to, for example, a user-selected speed, with other interface circuits being placed in a power down mode or low power state with possibly only the receiver of those interfaces being powered. In a presentation mode, the interface currently receiving or sending a signal cannot be powered down, even if it is momentarily not being used. This will then exclude the possibility of losing a connection when presenting information sent to a communication device or sent from a communication device.

Whether the communication device powers interface circuits using a detector of an incoming signal via an intelligent control mechanism or whether a user preference sets power states within the interfaces, the state of the host/device can possibly be monitored to override the current operating states of each interface. For example, if the host device detects a battery charge below a certain threshold, either the user will be informed of the battery charge to allow the user to power down interfaces, or the interfaces will be automatically powered down after a certain time-out period. The warning can be used in order to notify a user that interfaces will be automatically powered down in order for the user to possibly save the received information before the power down occurs. Thus, the present portable communication device can automatically control the interface circuits based on either the user preference for overall battery life, the communication environment in which the device is currently receiving information, and the state of the host device.

Broadly speaking, a wireless communication device is provided. The device includes a plurality of interface circuits coupled to respective antennas. A detector is coupled to the interface circuits for detecting a signal recognizable by a first one of the interface circuits, and providing power to the first one while removing power from possibly other interface circuits. As defined herein, "removing power" refers to removing power from various portions of the interface circuit while possibly retaining power only in those portions necessary to recognize an incoming signal. The portions that retain power include the receiver and transmitter portions, henceforth referred to as the transceiver. Thus, other portions can be powered down entirely, yet with the transceiver retained in a low power state.

Along with the transceiver, a controller can also be provided with the communication device. The controller is coupled to receive input through a GUI to select either the first one or a second one of the interface circuits. The controller also provides power to the first or second ones while removing power from other interface circuits. The controller can thereby possibly override the detector function of automatically providing power and removing power based on the incoming signal. Alternatively, the detector can possibly override the controller by overriding the selection chosen by a user based on the signal being recognizable to a particular interface device even though a user might designate that interface as being powered down. Therefore, the detector would intelligently and automatically power up the user-selected interface that the user has chosen to be powered down.

The GUI can be adapted to allow a user to provide power to the first, second, third, or more interface circuits depending on (i) a user preference for maximum battery life used to power the communication device, (ii) a user preference for maximum performance of the communication device regardless of power consumption, or (iii) a blend between a user preference for maximum battery life and maximum performance, which may include powering down all interfaces that do not currently have an active connection and are not receiving a signal and subsequently powering up those interfaces when scanning the wireless medium via an interrogation signal after a predetermined time setting. In addition, the GUI is adapted to allow a user to provide power to the first, second, third, or more, interface circuits depending on whether charge on a battery used to power the communication device drops below a predetermined threshold. The charge on the battery is displayed on the GUI to allow a user to power down via the GUI all interface circuits not receiving a signal, and if the charge on the battery being displayed drops below the predetermined threshold, to warn a user to power down via the GUI all interface circuits including those receiving a signal.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
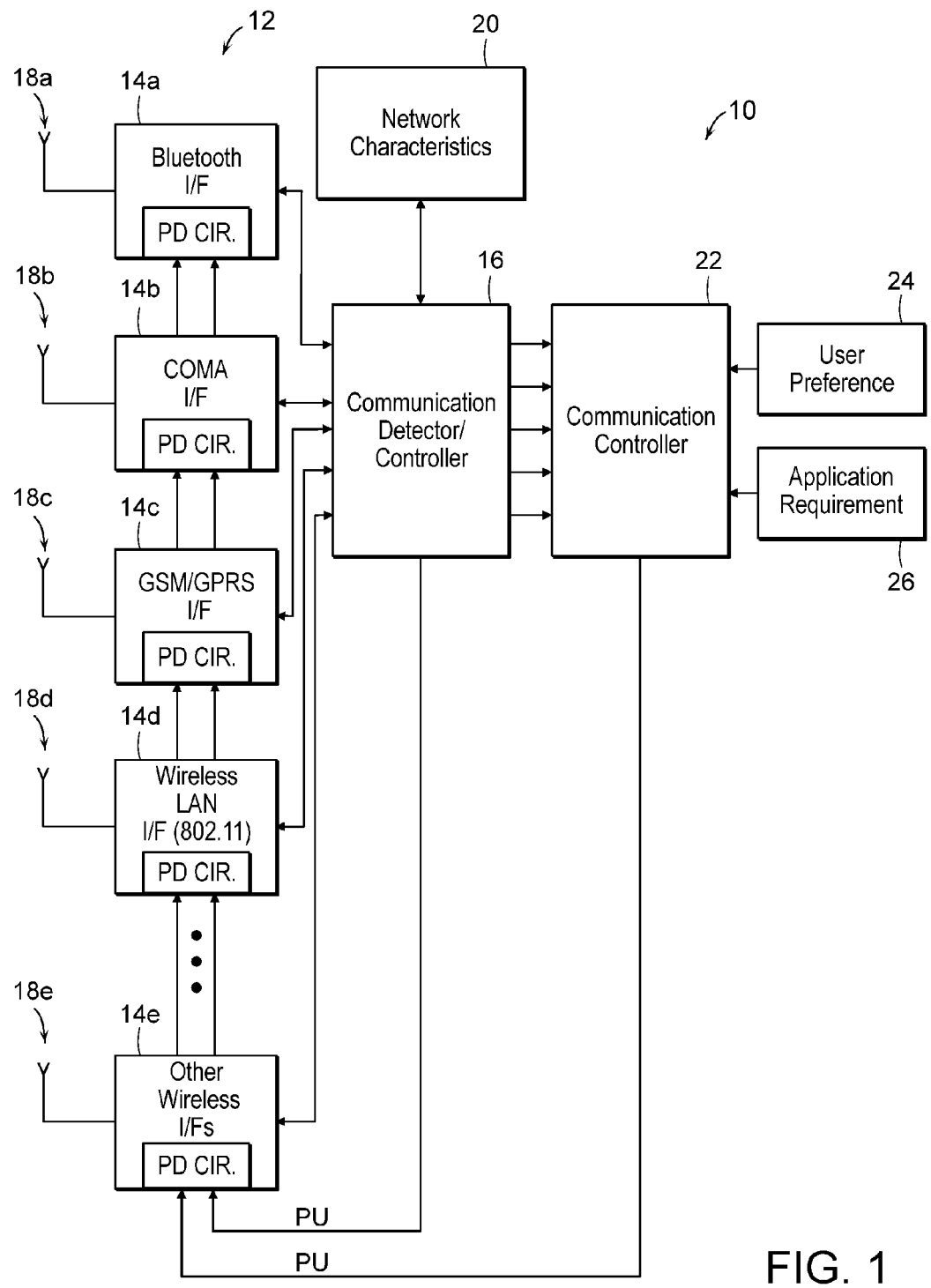
FIG. 1 is a block diagram of a communication device having multiple radios and corresponding wireless interfaces controlled by the wireless signal, application program, or user preference.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates a portable communication device 10 having multiple radios 12. Each radio includes a wireless interface 14. In the example shown, there are four interface circuits associated with device 10. However, it is recognized that there can be as few as one and more than four interface circuits, depending on how the device is built and the communication applications in which it will be used. Preferably, however, at least two interface circuits are onboard.

In the exemplary set of interface circuits, a short-range wireless interface such as Bluetooth® interface 14a is provided for communicating with other computers, mobile phones, and other portable devices in accordance with a short-range digital communication protocol. Bluetooth® wireless technology is a standard as well as a specification for small-form factor, low-cost, and short-range radio link between mobile computers, mobile phones, and other portable devices. Interface circuit 14b may involve a digital mobile radio interface such as CDMA or wideband CDMA radio interface. Interface 14c may involve a packet radio interface for sending and receiving packets of data. A popular packet radio interface includes global system for mobile communications (GSM) and general packet radio service (GPRS) interface circuitry. Interface circuit 14d may involve a wireless local area network (LAN) interface for communicating in accordance with wireless LAN standards such as IEEE 802.11 (a) and 802.11 (b).

Other wireless interfaces 14e can also be provided onboard. A popular such interface includes the evolution data only (EVDO) interface circuitry. Alternatively, interface 14e may involve an ultra-wideband (UWB) interface where no carrier is used. Alternatively, an analog RF interface or optical interface may also be provided. It may be possible that an interface could involve a software interface or module. A software interface may be configurable with software to allow each interface to be used/reused for different radio links. For example, rather than a radio interface having separate hardware for different communications, a software radio interface may have components configured or configurable to adopt the characteristics of different communication requirements. The interfaces can therefore be configured in software, firmware, in ROM, in BIOS, or in the Operating System (OS), or could be in some or all of the above, for example.

Regardless of whether two or more interfaces are placed onboard, communication device 10 is any mobile communication device, such as a notebook, laptop computer, PDA, mobile data terminal, wireless telephone, digital camera, video camera, or other multimedia device which may include functional combinations of each.

Interface circuits 14 each involve a transceiver as well as a serializer/deserializer and an encoder/decoder. Each interface can receive digital signals from multi-protocol controller 16, and can modulate the signals on a suitable carrier frequency before placing the modulated signals across the wireless medium via antennas 18. Thus, interface circuits 14 can transmit data onto the wireless medium as an encoded signal that is serialized. Each radio interface can also receive data via antennas 18. The signal can be demodulated and deserialized before sending the signal to controller 16. In the case of UWB communications, modulation and demodulation to and from a carrier frequency need not be performed.

The various radio interfaces are illustrated as functionally separate units, however, any one or more of such interface units can be combined as a single unit. Moreover, controller 16 might be integrated into a single unit interface circuit if desired. For example, some processing specific to a particular protocol may be performed by a radio interface. Thus, radio interfaces may be added or removed from device 10, and device 10 may include slots adapted to receive additional radio interfaces if necessary. One or more interface units 14 may be fabricated along with controller 16 as a separate module, circuit board, or add-on card for use in device 10.

Controller 16 performs many functions, one of which is to configure the information in accordance with an appropriate protocol for the selected communication link. Thus, controller 16 can accommodate multiple protocols. For example, multiple processors can be configured with firmware and software to interface with the wireless protocols sent across the wireless medium. Controller 16 can utilize radio interfaces to characterize available networks 20 to which device 10 can be connected. Current network and service information for an available network may include the services available, such as packet radio, digital voice, and data. Other services might be the protocol requirements such as TCP/IP, IPSec, Quality of Service (QoS) such as average bit rate, packet latency, and bit error rate. Other services that might be available include security such as virtual private network (VPN) capability, encryption type, encryption level, and so forth. Controller 16 can also query a service when multiple services are hosted by the network 20. For example, the same network may provide voice service, Internet access, data service without Internet access, a premium data service with better QoS, and so forth.

In characterizing the available communication network services/characteristics, controller 16 can utilize one or more of the interface units 12 to monitor communications. Monitoring such communications includes monitoring the traffic and signals sent across the wireless medium via antennas 18. Multiple radios may be implemented on one chip with several antennas or on one chip having a single antenna. Monitoring involves monitoring one of the available communication networks. In this embodiment, the monitored communications may be used to identify available communication networks and/or services as well as to determine how busy is a particular network and/or service and help identify available channels or available bandwidth for the particular network and its associated service. Controller 16 can also interrogate an available communication network and service to determine current network information and network characteristics. For example, controller 16 may cause one or more of the radio interfaces to send an interrogation signal requesting network characteristics and current network information. Interrogation may include a request for information as well as a request for service. In this request, a connection may be established to ascertain information and/or have a backup link in case an active link is dropped inadvertently.

In another embodiment, controller 16 may use geographic location information to determine the characteristics of the available communication networks. The geographic location of device 10 can be calculated and the characteristics of the available communication networks may be determined. Such a determination can be made based on the strength of the incoming signal when making judgments as to network characteristics and the QoS of that available network.

If, as a result of the interrogation signal and the received acknowledge signal, or the network characteristics derived from the strength of the incoming signal, indicates one network is preferable over another, then one interface may fall out of favor in lieu of another interface. If this is the case, the undesirable interface can be placed in a power-down mode or reduced-power state. Controller 16 thereby serves, at a minimum, to detect incoming signals and the returned acknowledge signals for determining a network characteristic 20 as well as the particular signal protocol and strength being sent across the wireless medium. Each interface 14 remains "on" in order to decode the incoming signal, and to pass that signal onto controller 16 to make a determination via the detector which interface is active and connected to the wireless medium. That interface may include various circuits that are not powered up, even though other circuits are used to demodulate, deserialize, and decode the incoming wireless signal. The circuits that are not powered up can be brought to their powered up state by the signal PU sent from controller 16 to the appropriate interface 14.

Controller 16 may contain memory to store current network information and characteristics for the available networks and/or services. A software agent running on a processor within device 10 utilizes an existing application program and functionally operates between that program and the radio interfaces 14. The software module may select one of the available networks for communicating based on the current network information and the characteristics of the available networks and/or services stored in controller 16. Shown separate from controller 16 is another controller 22. Controller 22 may be a part of controller 16 or exist as a separate functional module. Controller 22 may also contain the application program and the network characteristics of the available network and/or services, but in addition contains user preferences. The user preferences are input into controller 22 through a control panel, preferably through a Windows®-based control panel, such as the Windows Task Tray®. The Windows Task Tray®, as will be described below, can be modified through a separate shell module to contain various user preferences 24 for power managing each of the interface units 14. The shell extension module allows for the user to define a system module and, particularly, a GUI with a drop-down menu of various power state preferences that can be selected.

In addition to the user preferences 24, an application program may also have certain application requirements 26. The application requirements 26 can be stored in controller 22, along with user preferences 24. The software application typically requires a specification of how communication occurs over a network. The application requirements may include, for example, bit rate requirements, QoS requirements, connectivity continuity requirements, and privacy/security requirements. Application requirements 26 may also include latency and bit rate information for a particular software application. For example, voice communication may require lower latency and a lower bit rate than video conferencing which may require a higher bit rate and higher latency. Video playback, on the other hand, may be more tolerant on latency.

The user preferences 24 and the application requirements 26, when stored in controller 22, allow controller 22 to receive the demodulated, decoded, and parallel communication signal from a particular interface or set of interfaces and decide, based on the network characteristics and/or services stored in controller 16 and/or controller 22, to forward a power up (PU) signal to the appropriate interface 14. The PU signal will power up the remaining subsystems within the interface that is chosen to receive the incoming communication signal, even though the interface has sufficient power to detect the incoming signal and forward that signal along with its format and characteristics to controller 22. While controllers 16 and 22 formulate a decision on which interface is to receive the PU signal, all other interfaces can be placed in a low power standby mode by powering down those interfaces.

Figure 2:
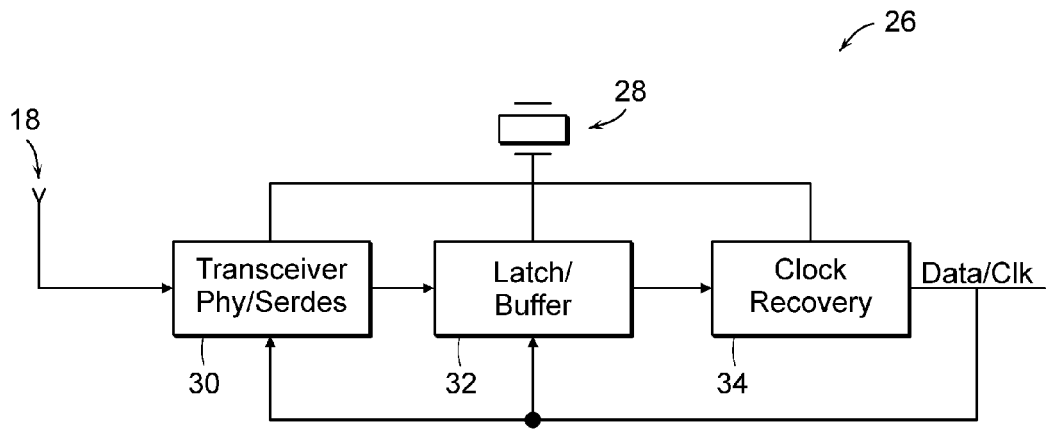
FIG. 2 is a block diagram of a portion of the wireless interface used to selectively receive power from a battery depending on whether the interface is chosen to receive power.

FIG. 2 illustrates a portion 26 of an interface 14 (FIG. 1). Portion 26 indicates a power supply shown as a battery 28 connected to the minimal circuits needed to recognize an incoming wireless signal. Those circuits include a transceiver 30, latch/buffer 32, and clock recovery circuit 34. Transceiver 30 includes both a receiver and a transmitter and the physical layer needed to perform modulation/demodulation, encoding/decoding, and serialization/deserialization. Latch/buffer 32 latches and amplifies the incoming signal and passes that signal onto, for example, a phase-locked loop within clock recovery circuit 34. Once the clock is recovered, the clocking signal can be used to trigger the latch/buffer circuit 32 and transceiver 30. Thus, the data and clock signals can be forwarded onto other subsystems or onto controller 16 (FIG. 1). There may be other power consumptive devices, such as amplifiers and oscillators that are turned off with no power applied thereto, outside of the circuitry used to recognize the incoming signal shown in FIG. 2.

Figure 3:
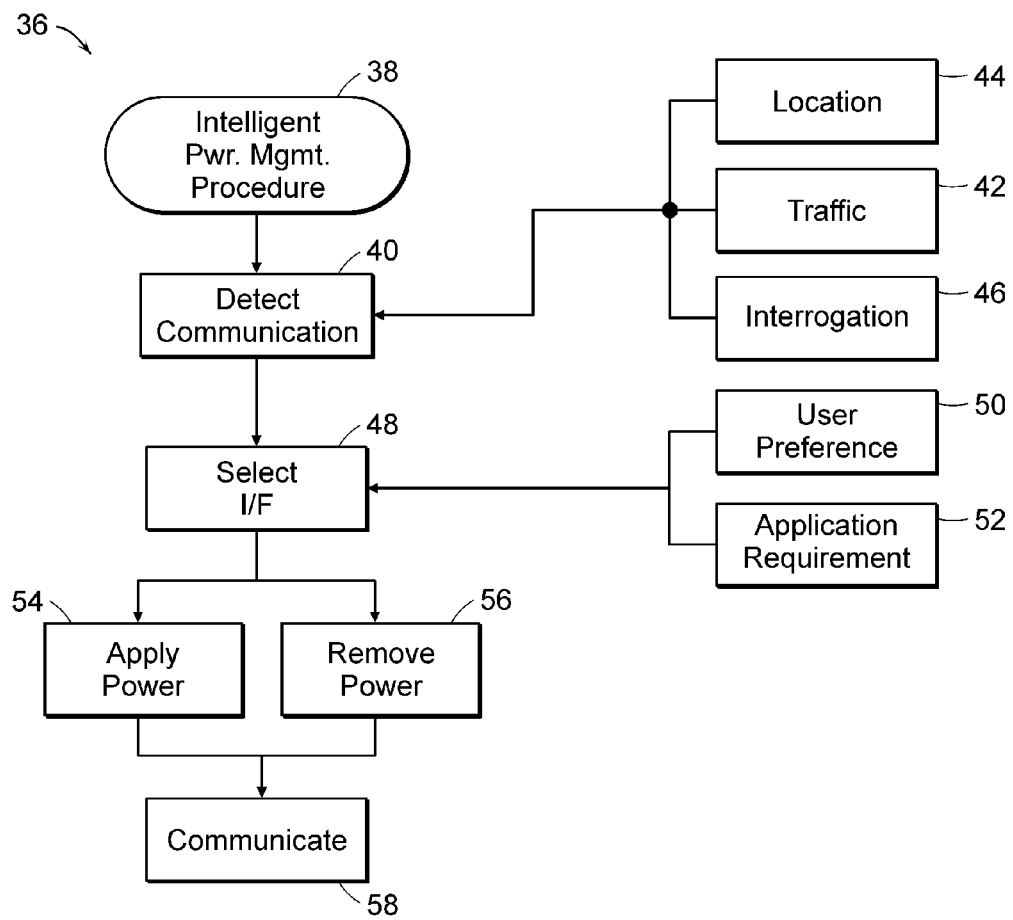
FIG. 3 is a flow diagram of an intelligent wireless interface control system and method for detecting communication within the wireless medium, selecting an interface to receive a wireless signal, and powering down or up various interfaces depending on their selection status.

Referring to FIG. 3, a flow diagram 36 is shown illustrating the intelligent interface selection mechanism and power management procedure. Procedure 36 can be performed by device 10 or by another wireless communication device suitably configured. Each operation shown in procedure 36 is illustrated and described as separate operations or steps. However, it is noted that one or more of the individual operations may be performed concurrently and certain steps can be combined as needed. Beginning with the initialization step 38, procedure 36 proceeds to the next step 40 of detecting a network link via a wireless signal forwarded to the various interface units. Each interface unit maintains minimal power to recognize the incoming signal on only the select interface units. The detection step 40 must first characterize the available networks and/or services to determine network characteristics and current network and service information. Traffic 42, location 44, and interrogation 46 signals are taken into account. The location of device 10 relative to the transmitter can be ascertained based on signal strength and the traffic on the channel can also be determined based on the bit rate. The interrogation signal 46 sent from device 10 can be returned as an acknowledge signal. Thus, the traffic, location, and interrogation information is taken into account when the detection process 40 occurs.

Depending on which network communication is detected, a particular interface can then be selected 48. The selected interface is affected by possibly the user preference 50 as well as the application program requirement 52. Once a specific interface is selected, that interface may receive the PU signal to apply power 54, with all other interfaces being removed of power 56. Thereafter, communication 58 is undertaken by the selected interface.

In order to allow for user preferences to be entered using a GUI and to automatically set certain requirements based on the application program. An extension may be needed to the Windows®-based operating system, for example, Windows 95®, Windows NT®, Windows CE®, Windows 98®, Windows XP Tablet®, etc. As an operating system extension, a module can be added and readily configured via the Windows® control panel and Explorer. The wireless control program subsystem is thereby visible, possibly in the Windows Task Tray® and activated for diagnostic reporting and viewing of the running devices and the interfaces.

Figure 4:
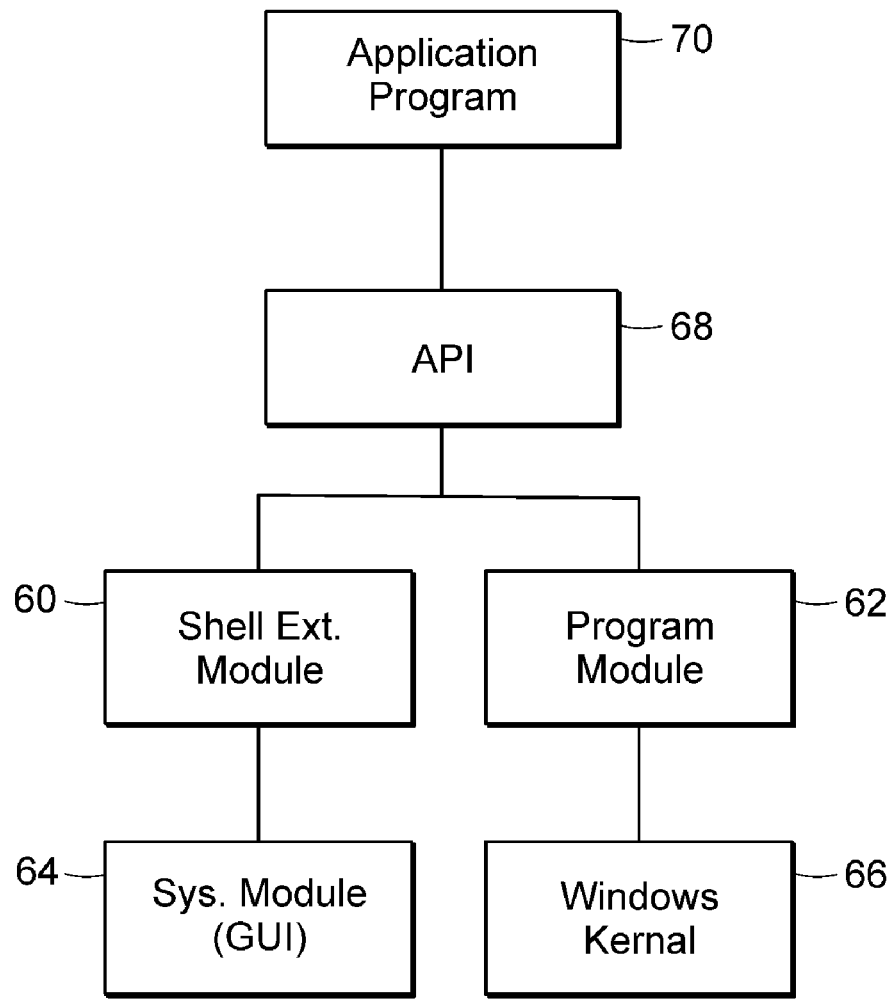
FIG. 4 is a block diagram of various software layers and modules used to provide intelligent wireless interface control.

Referring to FIG. 4, the infrastructure of the various add-on modules are shown with several discrete layers of modules, including a shell extension module 50, a programming module 62, a system module (64), a Windows® kernal 66, and an industry standard application program interface (API) 68. An application program 70 thereby conveys information through the API 68 to the various modules.

The Windows® kernal 66 is the operating system central module that loads and remains in the computer main memory, and provides essential services such as memory management and process and task management. Programming module 62 can extend the Windows® operating system and provides wireless-specific calls. System module 64 provides software objects and additional GUI elements to the wireless control program subsystem and controls the actual wireless devices attached to the computer. It treats the wireless devices as system resources and takes advantage of other system resources and events such as hardware interrupt. The shell extension module extends the Windows® operating system by extending the Windows® shell already packaged with the Windows® operating system. With this shell extension, the user can configure and view all the current interface units attached to the system as well as manipulate the interface units. Via the Windows Task Tray®, the user can configure the icon and allow users to readily see running diagnostics and configured dynamic properties of the interface units. API 68 allows development of industry-standard programs using, for example, ActiveX® controls. Module 68 can also include a wireless Windows® development tool with a WinSock® driver. The purpose of showing the various layers or modules between the application program 70 and the lowermost system 64 and kernal 66 modules, is to indicate that through the Windows® operating system and the modules available from Microsoft Corporation®, GUI control panels can be constructed specific to power management of wireless interface units. Such control panels are shown in FIGS. 5 and 6, when configured in accordance with the embodiments hereof.

Figure 5:
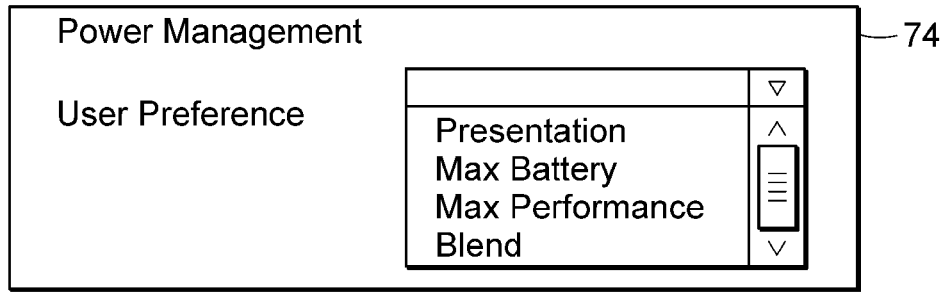
FIG. 5 is a Windows® control panel for setting a user preference in the selection of a wireless interface depending on an application requirement.
Figure 6:
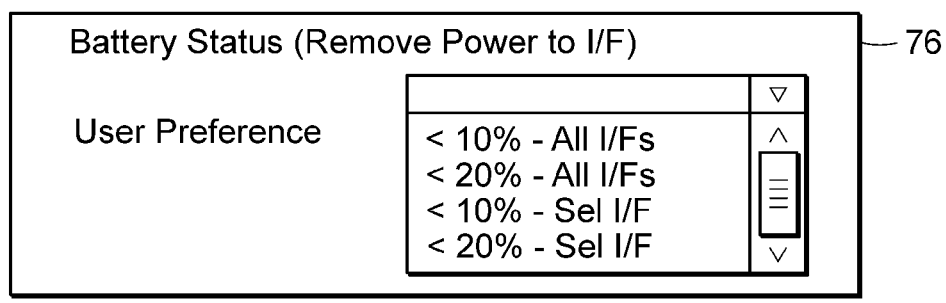
FIG. 6 is a Windows® control panel for setting a user preference in the selection of a wireless interface depending on a battery charge status.

FIG. 5 illustrates a exemplary control panel 74 that is displayed on a display screen of device 10 (FIG. 1). Control panel 74 is a power management control panel in which a user can select certain preferences. Those preferences might include moving a curser to either the presentation, max battery, max performance, or blend text and clicking on an input device when the curser is presented over the selected text. When so doing, the user is then selecting a particular power management mode or state for one or more interfaces. Accordingly, control panel 74 can be specific to one interface or all interfaces. According to one example, if applicable to all interfaces, selecting the max battery text would turn off all interfaces that are currently not active. Max performance, on the other hand, would turn on all interfaces even those that are not active. Presentation would only maintain a select interface as active regardless of whether that interface is always active, and all other interfaces could be turned off. As noted herein, turning off an interface would be to place that interface in a low power state, with only the circuitry needed to recognize an incoming signal being powered on. By selecting the blend text, a user can program a hybrid between the presentation, max battery, and max performance modes in whatever fashion the user might desire.

Control panel 76 shown in FIG. 6 might be used to warn an operator when the battery status is below a certain threshold. Also, control panel 76 might be one that can allow a user to select what might automatically occur when the battery drops below a certain threshold. For example, if the battery drops below 10% charge, then all interfaces might be turned off. The user preference can be selected in whatever manner the user desires by changing the system module 64 and shell extension module 60 (FIG. 4). Accordingly, the examples of control panels 74 and 76 are merely examples. However, regardless of how the modules are configured and the controls panels are arranged, it is desirable for a user to set preferences on both power management and what would occur if the battery charge drops below a certain threshold value. Control panels 74 and 76 illustrate this concept.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A wireless communication device, comprising:
a plurality of interface circuits coupled to respective antennas, wherein each of the plurality of interface circuits comprises:
a physical device that recognizes the signal provided in a format unique to that interface circuit, said signal having characteristics selected from a group consisting of a signal strength exceeding a threshold, and a bit rate within a pre-determined range;
an amplifier; and
a clock recovery circuit having an oscillator;
a detector coupled to the interface circuits for detecting a signal recognizable by a first one of the interface circuits and for providing power to the first one of the interface circuits while removing power from other interface circuits, wherein the detector provides power to the amplifier and oscillator if the physical device recognizes the signal, otherwise the amplifier and oscillator do not receive power; and
a controller coupled to receive input via a graphical user input to select either the first one of the interface circuits or a second one of the interface circuits and for providing power to the first one or the second one of the interface circuits while removing power from other interface circuits, wherein the controller provides power to the amplifier and oscillator regardless of whether the physical device recognizes the signal if the controller selects the interface that comprises the amplifier and oscillator.

2. The wireless communication device as recited in claim 1, wherein the other interface circuits comprise all but the first one and the second one of the interface circuits.

3. The wireless communication device as recited in claim 1, wherein the interface circuits comprise a Bluetooth interface circuit, a code division multiple access (CDMA) interface circuit, a global system for mobile communications (GSM) interface circuit, a general packet radio service (GPRS) interface circuit, evolution data only (EVDO) interface circuit, and a wireless local area network interface circuit utilizing IEEE 802.11 protocol.

4. The wireless communication device as recited in claim 1, wherein the graphical user input is adapted to allow a user to selectively provide power to a subset of the interface circuits depending on user preferences selected from a group consisting of (i) a user preference for maximum battery life used to power the communication device, (ii) a user preference for maximum performance of the communication device regardless of power consumption, and (iii) a blend between a user preference for maximum battery life and maximum performance.

5. The wireless communication device as recited in claim 4, wherein the user preference for maximum battery life comprises powering down all interfaces that do not currently have an active connection and are not receiving the signal and subsequently powering up those interfaces and scan the wireless medium by sending an interrogation signal after a predetermined time setting.

6. The wireless communication device as recited in claim 1, wherein the graphical user input is adapted to allow a user to provide power to the first, second, third, or more interface circuits depending on whether charge on a battery used to power the communication device drops below a predetermined threshold.

7. The wireless communication device as recited in claim 6, wherein the charge on the battery is displayed on the graphical user interface to warn a user to power down via the graphical user input all interface circuits not receiving the signal and, if the charge on the battery being displayed drops below the predetermined threshold to warn a user to power down via the graphical user interface all interface circuits including those receiving the signal.

8. A wireless communication device, comprising:
a plurality of interface circuits coupled to receive a communication signal forwarded across a wireless medium;
a controller coupled to the interface circuits;
a graphical user interface presented on a display coupled to the controller and adapted to forward a signal to the controller in response to a user input for selectively modifying performance of a subset of the interface circuits depending on a user preference selected from a group consisting of maximum battery life, maximum performance, the format, speed or bit rate of a communication signal sent across the wireless medium, and a charge on a battery used to supply power to the communication device; and
a detector coupled to receive the communication signal and to override the user input depending on which of the plurality of interface circuits recognizes the communication signal.

9. The wireless communication device as recited in claim 8, wherein said selectively modifying performance of the subset comprises selectively powering down the subset.

10. The wireless communication device as recited in claim 8, wherein said selectively modifying performance of the subset comprises selectively reducing clock speed within the subset.

11. The wireless communication device as recited in claim 8, wherein said selectively modifying performance of the subset comprises selectively powering down a portion circuits within the subset.

12. A method for controlling wireless interface circuits within a communication device, comprising:
   controlling power to a plurality of interface circuits depending on a user preference input to the communication device via a graphical user input;
   detecting a signal sent across a wireless medium to see which one of a plurality of interface circuits can recognize that signal; and
   overriding power applied to the interface circuits depending on user preference and applying power to the one interface circuit that recognizes the signal while removing power from other interface circuits.

13. The method as recited in claim 12, wherein said controlling is selected from a group consisting of applying power to each of interface circuits at all times, applying power to only the interface circuits that recognize the signal, and applying power to the interface circuits if a charge on a battery powering the communication device is above a pre-determined threshold.

14. The method as recited in claim 12, wherein said detecting is selected from a group consisting of determining signal strength of the signal, traffic upon a wireless medium across which the signal is sent, and the status of an acknowledge signal sent to the interface circuits in response to the an interface circuit sending an interrogation signal.

* * * * *